Figure 4:
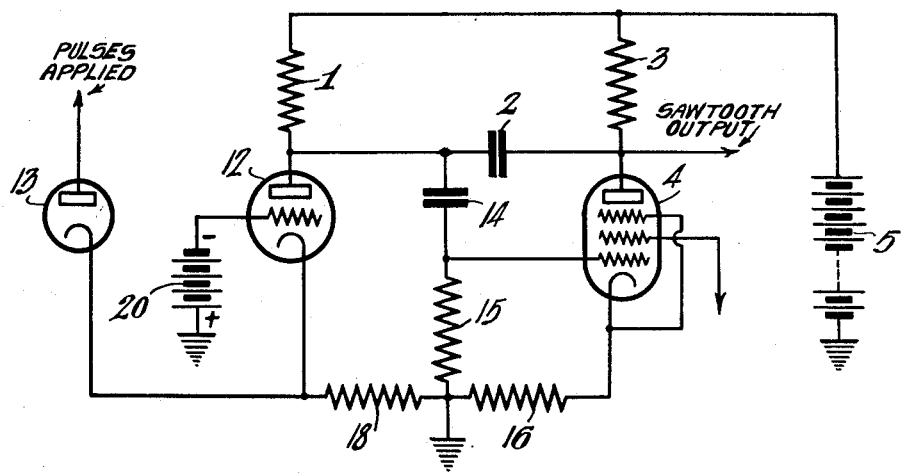

Dec. 25, 1956 A. D. BLUMLEIN 2,775,694
ELECTRICAL CIRCUIT ARRANGEMENTS FOR EFFECTING
INTEGRATION AND APPLICATIONS THEREOF
Original Filed May 8, 1945 2 Sheets-Sheet 1
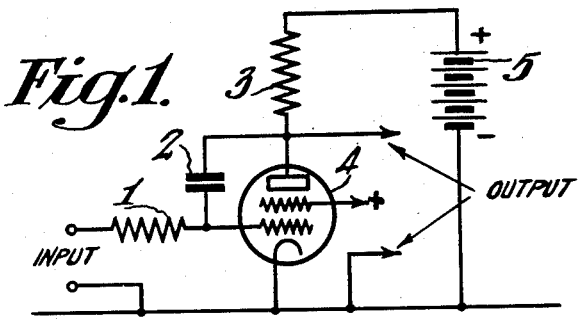
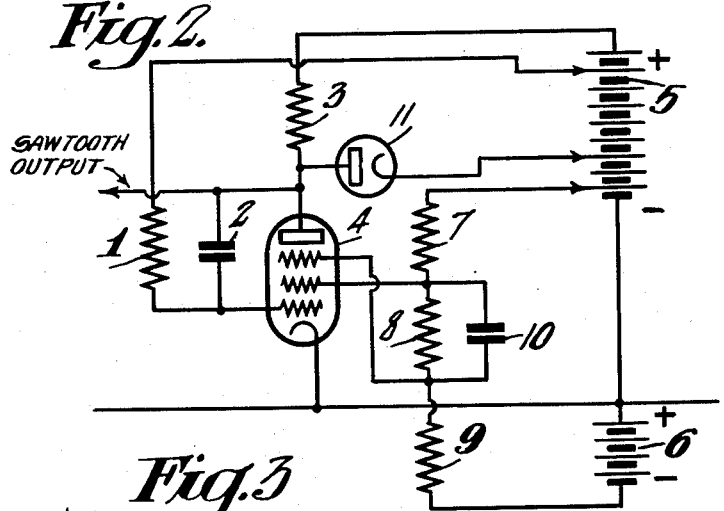
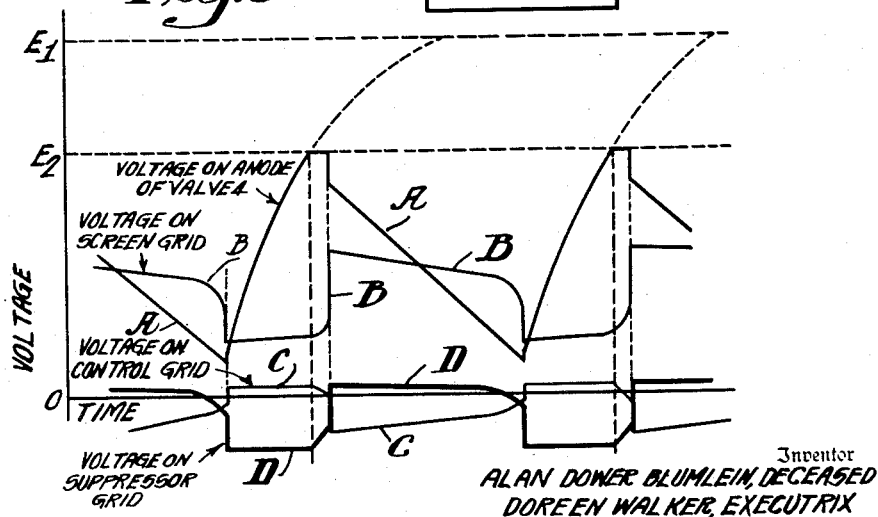
Inventor
ALAN DOWER BLUMLEIN, DECEASED
DOREEN WALKER, EXECUTRIX
By
H. G. Grover
Attorney United States Patent Office 2,775,694
Patented Dec. 25, 1956

2,775,694

ELECTRICAL CIRCUIT ARRANGEMENTS FOR EFFECTING INTEGRATION AND APPLICATIONS THEREOF

Alan Dower Blumlein, deceased, late of Ealing, London, England, by Doreen Walker, legal representative, Lanherne Lescudjack, Penzance, England, assignor to Electric and Musical Industries Limited, a British company Original application May 8, 1945, Serial No. 592,641, now Patent No. 2,692,334, dated October 19, 1954. Divided and this application June 4, 1953, Serial No. 365,931

3 Claims. (Cl. 250—27)

This invention relates to electrical circuits for effecting integration and to applications thereof. This application is a division of copending Blumlein application, Serial No. 592,641, filed May 8, 1945, entitled "Electrical Circuit Arrangements for Effecting Integration and Applications Thereof," now Patent 2,692,334, issued October 19, 1954.

It is often desired to develop a voltage which represents the time integral of a given voltage, and circuits of this kind have been proposed which comprise a resistance connected in series with a condenser. If the voltage to be integrated is applied across the series connected resistance and condenser, the voltage developed across the condenser is proportional to the time integral of the applied voltage provided that the voltage developed across the condenser is never allowed to exceed a value small compared with the applied voltage. This limitation is inconvenient in practice, as it will usually necessitate the amplification of the integrated voltage developed across the condenser and this amplification may introduce distortion and thereby introduce error into the integration.

The object of the present invention is to provide an electrical circuit arrangement for effecting integration in which the disadvantage referred to is avoided.

According to the present invention there is provided an electrical circuit arrangement for integrating a voltage which comprises a source of voltage, an integrating circuit including a first impedance, a capacity and a second impedance effectively connected in series across said source and a thermionic valve, the input and output circuits of said valve being respectively associated with said first and second impedances in such a manner that said capacity provides a negative feedback path between said output circuit and said input circuit, the arrangement being such that a voltage representing the time integral of the voltage of said source is developed in said output circuit.

If desired, more than one voltage may be simultaneously integrated and said voltages may be constant voltages, in which case the voltage representing said time integral will increase or decrease linearly with time.

Further, means may be provided for causing said valve to become nonconducting when said output voltage reaches a predetermined value, whereby output voltages of sawtooth waveform may be developed. Said means may if desired comprise a coupling between two electrodes of said valve such that when said output voltage falls to a predetermined value said valve is rendered non-conducting.

The invention may also be applied to the generation of pulses delayed by a controllable time with respect to applied pulses.

In order that the said invention may be clearly understood and readily carried into effect it will now be described in detail with reference to the accompanying drawings, in which:

Figure 1 shows a circuit arrangement of one form of the invention,

Figure 2 shows a circuit arrangement of another form of the invention which is adapted to generate a voltage of sawtooth waveform, Figure 3 shows the voltage waveform developed in operation at particular points in the circuit arrangement shown in Figure 2, and Figure 4 shows a circuit arrangement according to another form of the invention which is adapted to generate a voltage of sawtooth waveform.

Referring to Figure 1, it will be seen that the circuit arrangement comprises the integrating circuit consisting of the resistance 1, the capacity 2 and the resistance 3 all connected in series and the thermionic valve 4, the control grid of which is connected to the common point of the resistance 1 and capacity 2 and the anode of which is connected to the common point of the capacity 2 and the resistance 3. The cathode of the valve 4 is connected to the negative pole of the source of anode voltage 5, the positive pole of which is connected to the end of resistance 3 remote from the capacity 2. The voltage to be integrated is applied between the end of resistance 1 remote from the capacity 2 and the cathode of valve 4, i. e., effectively across the integrating circuit. Means (not shown) are also provided for biasing the control grid of valve 4 so as to avoid the flow of grid current. The voltage representing the time integral of said applied voltage is developed between the anode and cathode of the valve 4.

The mode of operation of this circuit arrangement may be described as follows. On the application of the voltage to be integrated, current flows into the integrating circuit to charge the condenser 2 and, in the absence of the valve 4, assuming that the voltage to be integrated is a constant voltage, the voltage across condenser 2 would rise towards the value of the applied voltage, and as soon as the voltage set up across said condenser exceeded a value small compared with the applied voltage, the charging current would cease to be directly proportional to the applied voltage and the integration would cease to be accurate. Due to the presence of the valve 4, however, any tendency of the charging current to decrease due to the voltage developed in the condenser 2 is resisted by negative feedback via condenser 2, since any decrease in the charging current will reduce the voltage drop in resistance 1 and will make the grid of valve 4 more positive, thus increasing the anode current of said valve and thereby increasing the voltage drop in resistance 3, which effectively increases the charging voltage across condenser 2. Thus, the decrease in charging current which would otherwise follow from the voltage developed in the condenser 2 is opposed, and the charging circuit behaves as though it has a very long time constant.

It can be shown that the voltage developed between the anode and cathode of the valve 4 will be substantially proportional to the time integral of the applied voltage provided that the angular frequencies of the Fourier components of the applied voltage satisfy the inequality.

$$G \gg \frac{1}{\omega CR} \gg \frac{1}{gR}$$

where G is the gain of the valve 4 in the absence of capacity 2, $g$ is the mutual conductance of the valve 4, R is the value of resistance 1 and C is the value of capacity 2. As in practice the product $GR_g$ may usually be as large as $10^6$, accurate integration can be effected over a wide range of frequency with good amplification so that it is possible to generate integrated voltages of amplitude substantially greater than the amplitude of the applied voltage without appreciable error in integration.

It will be appreciated that the circuit arrangement which has just been described is suitable for the integration of voltages of any waveform, the Fourier components of which satisfy the above inequality. If desired, it may be employed to integrate a constant voltage, in which case the integrated voltage will either increase or decrease in value at a uniform rate for time periods small compared with $2\pi GCR$.

Further, more than one voltage may be integrated simultaneously if desired. Thus, a second voltage may be applied to the grid of the valve through a further resistance similar to resistance 1 and the voltage developed at the anode of valve 4 will then represent the sum of the time integrals of the first and second voltages, respectively.

The circuit arrangement illustrated in Figure 1 may be employed for the generation of sawtooth waveforms by arranging for different constant voltages to be integrated in successive time periods, or by arranging for an additional voltage to be integrated in alternate time periods. One example of a circuit arrangement of the latter kind will now be described with reference to Figure 4.

Referring now to Figure 4, in which elements corresponding to elements of Figures 1 and 2 are given the same reference numerals, it will be seen that the arrangement of Figure 1 has been retained in principle but that a further resistance has been provided in the form of the anode/cathode path of a further valve 12, which is connected between one side of the capacity 2 and earth, and, as will be explained, is rendered alternately conducting and non-conducting by pulses applied through the diode 13. Grid condenser 14 and leak 15, together with resistance 16 in the cathode circuit of valve 4, have been introduced solely to allow the bias on the control electrode of valve 4 to be suitably chosen to avoid grid current. The resistance 18 is included between the cathode of valve 12 and earth and the grid of valve 12 is taken to a source of bias voltage 20 such that the valve 12 is normally conducting. The cathode of diode 13 is connected to the cathode of valve 12 and the anode of said diode is taken to a source of pulse or bias voltage (not shown) which alternately raises and lowers the voltage of said anode. When the voltage on the anode of diode 13 is positive, said diode conducts and the cathode of valve 12 is raised to substantially the voltage of said anode whereupon valve 12 is biased beyond cut-off and valve 4 operates in the manner described with reference to Figure 1 to integrate a high positive voltage and the voltage on the anode of valve 4 descends at a uniform rate. When, however, the anode of diode 13 is made negative said diode becomes non-conducting and the valve 12 thereupon conducts, so that a second voltage, namely, the voltage on the cathode of valve 12, is applied to the control grid of valve 4 through the anode/cathode resistances of valve 12. Thus, two voltages are simultaneously integrated, the first being the high positive voltage applied to the upper end of resistance 1 and the second to the much lower voltage, negative with respect to the voltage on capacity 2, of the cathode of valve 12, and it can be arranged that the capacity 2 discharges and the voltage on the anode of valve 4 rises at a uniform rate. Thus, a sawtooth voltage is developed at the anode of valve 4, the relative duration of the rising and falling portions of the sawtooth waveform being determined by the voltages applied to resistance 1 and to the cathode of valve 12 and also by the value of resistance 1 and the resistance of the anode/cathode path of valve 12 which latter can be adjusted by choice of the value of the cathode resistance 18.

It is also possible to convert the time integral of a constant voltage to a sawtooth waveform by periodically returning the integrated voltage to some predetermined value and one circuit arrangement suitable for generating a sawtooth waveform in this manner will now be described by way of example with reference to Figures 2 and 3. Referring to Figure 2, in which elements having the same function as those in Figure 1 are given the same reference numerals, it will be seen that the end of resistance 1 remote from the condenser 2 is connected to a point of suitable voltage in the source of anode voltage 5, so that the voltage to be integrated is a constant voltage. The valve 4 in this case is a pentode valve, and the voltages on the screen grid and suppressor grid of valve 4 are supplied from a potentiometer comprising resistors 7, 8 and 9 connected between a point of suitable voltage in the source of voltage 5 and the negative pole of the source of bias 6 having its positive pole connected to the negative pole of the source 5. The potentiometer consisting of resistances 7, 8 and 9 all connected in series has a capacity 10 connected in shunt with resistance 8, and the screen grid of valve 4 is connected to the common point of resistances 7 and 8, while the suppressor grid of valve 4 is connected to the common point of resistances 8 and 9.

A unilaterally conducting device, namely, the diode 11, is also provided, the anode of this diode being connected to valve 4 and its cathode being connected to a point of suitable voltage in the source of voltage 5.

The arrangement operates as follows. The arrangement normally operates in the manner described with reference to Figure 1, the voltage on the anode of valve 4 steadily decreasing at a uniform rate due to the integration of the constant voltage applied via resistance 1 to the grid of valve 4. As the voltage of the anode of valve 4 continues to fall it will eventually bring valve 4 to an operating point on the knee of the anode voltage/anode current characteristic of this valve, when the anode current will tend to decrease due to loss of current to the screen grid. The rate of fall of anode voltage is thus reduced, the grid voltage then becomes more positive and more current passes to the screen grid, so causing the screen grid voltage to fall due to the voltage drop caused by the flow of the increased screen grid current through resistance 7. This drop in the screen grid voltage then causes the voltage on the suppressor grid to fall, which further diminishes the anode current and increases the screen grid current due to the fact that the suppressor grid is driven to a voltage which is negative with respect to the cathode of valve 4. Thus, the suppressor grid is rapidly lowered to a voltage so negative that the anode current of valve 4 is completely cut off. The voltage on the anode of valve 4 then rises rapidly and this rise of voltage holds the grid of valve 4 very positive, thus maintaining a high screen grid current and holding the suppressor grid very negative. As the voltage of the anode rises towards the voltage of the source 5, the rate of rise diminishes and the grid voltage falls, when the current to the screening grid begins to decrease and the voltages on the screening grid and suppressor rise and permit the flow of current to the anode to commence and the valve 4 quickly assumes full conductivity. The drop in anode voltage caused by the anode current is communicated to the control grid which is driven sufficiently negative to stop the flow of grid current, and the integration stroke recommences.

The mode of operation which has just been described makes no reference either to the condenser 10 or to the diode 11, neither of which is essential. The advantage of condenser 10 is that it enables the suppressor grid fully to follow rapid variations in the voltage on the screen grid. The advantage given by the diode 11 is that it serves to limit the rise in voltage of the anode of valve 4 to the voltage applied to the cathode of the diode and thereby stabilizes the amplitude of the sawtooth waveform which develops on the anode of valve 4. Thus, when the voltage on the anode of valve 4 reaches the voltage on the cathode of diode 11, said diode becomes conducting and the anode voltage therefrom cannot rise further and consequently the voltage on the grid falls due to the cessation of the rise of anode voltage. The current to the screening grid then decreases and the screening grid potential increases and this in turn brings about a rapid increase in anode current in the valve 4 due to the consequent rise in the voltage on the suppressor grid of this valve. Thus, the valve is returned to the fully conducting state when the anode voltage reaches the voltage of the cathode of the diode 11, which is an adjustable constant voltage independent of the characteristics of the valve 4.

The operation of the circuit which has just been described will be made clearer by reference to Figure 3 of the drawings, in which the variations in voltage on certain points of the circuit arrangement of Figure 2 are shown. In the figure, the axis of abscissae represents time and the axis of ordinates represents voltage. The voltage indicated by the horizontal dotted line $E_1$ is the voltage of the source 5 and the voltage indicated by the dotted line marked $E_2$ is the voltage of the cathode of diode 11. The voltage on the anode of valve 4 is shown by the full line marked A in the drawing, the voltage on the screening grid of this valve by the full line marked B, the voltage on the control grid by the full line marked C and the voltage on the suppressor grid by the full line marked D. It should be stated that the time of the flyback stroke has been intentionally exaggerated in comparison with the integration stroke which provides the rising portion of the sawtooth in order to make the operation of the circuit clear. The rise in the anode voltage during the flyback period is seen to be of exponential form and in the absence of the diode 11 would continue as shown by the dotted line up to the voltage $E_1$ of the source 5 until the valve 4 again becomes conducting in the manner described due to the decrease in the rate of rise of anode voltage.

What is claimed is:

1. A circuit arrangement for integrating a voltage which comprises a source of voltage, an amplifier comprising an odd number of stages and including a thermionic valve having anode-cathode impedance, an integrating circuit including a first impedance unit and a second impedance unit of a different kind of impedance, said source of voltage, said anode-cathode impedance and said two impedance units all being connected in series with each other, said amplifier having an input circuit and an output circuit, said first impedance unit being connected to apply voltage from said source of voltage through the first impedance unit to said input circuit, said second impedance unit being connected from said output circuit to said input circuit whereby it provides a negative feedback path between said output circuit and said input circuit, a further source of voltage, a further impedance like said first impedance connected to apply voltage from said further source through said further impedance to said input circuit and constituting with said second impedance unit a further integrating circuit whereby a voltage representing the sum of the time integrals of the voltages of said source and said further source, respectively, is developed in said output circuit.

2. A circuit arrangement for integrating a voltage which comprises a source of voltage, an amplifier comprising an odd number of stages and including a thermionic valve having anode-cathode impedance, an integrating circuit including a first impedance unit and a second impedance unit of a different kind of impedance, said source of voltage, said anode-cathode impedance and said two impedance units all being connected in series with each other, said amplifier having an input circuit and an output circuit, said first impedance unit being connected to apply voltage from said source of voltage through the first impedance unit to said input circuit, said second impedance unit being connected from said output circuit to said input circuit whereby it provides a negative feedback path between said output circuit and said input circuit, a further source of voltage, a further impedance like said first impedance connected to apply voltage from said further source through said further impedance to said input circuit and constituting with said second impedance unit a further integrating circuit whereby a voltage representing the sum of the time integrals of the voltages of said source and said further source, respectively, is developed in said output circuit, and comprising means for causing said valve to become non-conducting in response to the output voltage reaching a predetermined value whereby said output voltage is of a sawtooth waveform.

3. The invention according to claim 1 wherein said further impedance comprises the anode-cathode path of a further thermionic valve and in which switching means are provided to cause said further valve to become successively conducting and non-conducting whereby the voltage developed in said output circuit is of sawtooth waveform.

References Cited in the file of this patent

UNITED STATES PATENTS

| | | |
|---|---|---|
| 2,269,001 | Blumlein | Jan. 6, 1942 |
| 2,412,063 | Rosentreter | Dec. 3, 1946 |
| 2,412,485 | Whiteley | Dec. 10, 1946 |
| 2,594,104 | Washburn | Apr. 22, 1952 |